(12) United States Patent
Whitt

(10) Patent No.: US 10,160,244 B1
(45) Date of Patent: Dec. 25, 2018

(54) METHOD FOR DYE-SUBLIMATION PRINTING AN ORTHOTIC SUBSTRATE AND ORTHOTIC PRODUCT MADE THEREBY

(71) Applicant: John Garrett Whitt, Pleasant Hill, MO (US)

(72) Inventor: John Garrett Whitt, Pleasant Hill, MO (US)

( * ) Notice: Subject to any disclaimer, the term of this patent is extended or adjusted under 35 U.S.C. 154(b) by 27 days.

(21) Appl. No.: 15/486,775

(22) Filed: Apr. 13, 2017

(51) Int. Cl.
| | |
|---|---|
| *B41M 5/035* | (2006.01) |
| *A43D 3/02* | (2006.01) |
| *A43D 8/22* | (2006.01) |
| *B41M 3/00* | (2006.01) |
| *B41M 3/12* | (2006.01) |
| *B44C 1/17* | (2006.01) |
| *B29C 51/10* | (2006.01) |
| *B29C 51/26* | (2006.01) |
| *B29L 31/50* | (2006.01) |

(Continued)

(52) U.S. Cl.
CPC .......... *B41M 3/008* (2013.01); *A43D 3/021* (2013.01); *A43D 8/22* (2013.01); *B29C 51/10* (2013.01); *B29C 51/264* (2013.01); *B29C 51/268* (2013.01); *B41M 3/12* (2013.01); *B41M 5/035* (2013.01); *B41M 5/0358* (2013.01); *B41M 5/385* (2013.01); *B44C 1/1712* (2013.01); *B29K 2023/06* (2013.01); *B29K 2105/256* (2013.01); *B29L 2031/50* (2013.01); *B41M 2205/02* (2013.01); *B41M 2205/30* (2013.01)

(58) Field of Classification Search
CPC .... B41M 5/035; B41M 5/0358; B41M 3/008; B41M 5/385; B41M 3/12; B41M 2205/02; B41M 2205/30; B29C 51/268; B29C 51/264; B29C 51/10; B44C 1/1712; A43D 8/22; A43D 3/021; B29K 2023/06; B29K 2105/256; B29L 2031/50
See application file for complete search history.

(56) References Cited

U.S. PATENT DOCUMENTS

| | | | | |
|---|---|---|---|---|
| 4,059,471 | A | * | 11/1977 | Haigh ............... B29C 49/52 101/34 |
| 4,202,663 | A | * | 5/1980 | Haigh ............... B29C 49/52 101/464 |

(Continued)

*Primary Examiner* — Jeffrey M Wollschlager
(74) *Attorney, Agent, or Firm* — Donna Denise Mashburn Chapman; Mashburn Law Office, LLC

(57) ABSTRACT

A two-part method for dye-sublimation printing a decorative design on a moldable orthotic substrate comprising a first digital printing step of printing a computer image file of a decorative design on a digital transfer paper substrate using dye-sublimation CMYK inks, and a second dye-sublimation printing step comprising the steps of heating an oven to a first temperature, placing a moldable orthotic substrate inside the oven, heating the moldable orthotic substrate to a second temperature, positioning the digital transfer paper substrate on the moldable orthotic substrate with the decorative design down and in contact with the moldable orthotic substrate, and sublimating the at least one color of dye-sublimation CMYK inks from the digital transfer paper substrate to the moldable orthotic substrate. A custom orthotic product may be manufactured by wrapping the dye-sublimation printed moldable orthotic substrate around an orthotic mold and applying a vacuum.

17 Claims, 4 Drawing Sheets

(51) Int. Cl.
 *B41M 5/385* (2006.01)
 *B29K 105/00* (2006.01)

(56) References Cited

U.S. PATENT DOCUMENTS

| | | | | |
|---|---|---|---|---|
| 4,232,076 A * | 11/1980 | Stetson | D06N 7/0007 | 156/79 |
| 4,314,814 A * | 2/1982 | Deroode | B29D 12/02 | 101/470 |
| 4,406,662 A * | 9/1983 | Beran | B41M 5/0355 | 8/471 |
| 4,596,190 A * | 6/1986 | Hanstein | B29C 51/00 | 101/32 |
| 4,664,672 A * | 5/1987 | Krajec | B41M 5/0358 | 8/471 |
| 5,088,484 A * | 2/1992 | Freeman | A61L 15/12 | 602/44 |
| 5,219,364 A * | 6/1993 | Lloyd | A61F 2/5046 | 623/27 |
| 5,573,501 A * | 11/1996 | Ruscito | A61F 5/0127 | 602/23 |
| 5,580,410 A * | 12/1996 | Johnston | B41M 5/0358 | 156/230 |
| 5,841,464 A * | 11/1998 | Phillips | B41J 2/471 | 347/225 |
| 5,868,801 A * | 2/1999 | Lindh | B29C 51/00 | 156/277 |
| 5,997,677 A * | 12/1999 | Zaher | B41M 5/0358 | 101/492 |
| 6,114,663 A * | 9/2000 | Stockley | A47J 37/0623 | 219/398 |
| 6,249,297 B1 * | 6/2001 | Lion | B41M 5/0358 | 347/171 |
| 6,392,680 B2 * | 5/2002 | Akada | B41M 5/0256 | 156/230 |
| 6,623,677 B1 * | 9/2003 | Smith | B29C 45/14688 | 264/132 |
| 6,814,831 B2 * | 11/2004 | Drake | B41M 5/0256 | 156/230 |
| 7,810,538 B2 * | 10/2010 | Magee | B41M 5/0256 | 156/498 |
| 8,308,891 B2 * | 11/2012 | Drake | B41M 5/0064 | 156/230 |
| 8,562,777 B2 * | 10/2013 | Drake | B41M 5/0256 | 156/230 |
| 9,707,713 B2 * | 7/2017 | Ferrara | B29C 51/165 | |
| 9,756,892 B2 * | 9/2017 | Laperriere | A42B 3/125 | |
| 2001/0044590 A1 * | 11/2001 | Ceriani | A61F 5/0125 | 602/26 |
| 2003/0079638 A1 * | 5/2003 | Burnett | B41M 5/035 | 101/492 |
| 2006/0088686 A1 * | 4/2006 | Stein | A61F 13/00059 | 428/99 |
| 2007/0039682 A1 * | 2/2007 | Drake | B41M 5/0064 | 156/230 |
| 2009/0321002 A1 * | 12/2009 | Spengler | B29C 51/004 | 156/221 |
| 2010/0129262 A1 * | 5/2010 | Shanafelter | G01N 35/021 | 422/400 |
| 2010/0129621 A1 * | 5/2010 | Langan | B41M 5/0358 | 428/201 |
| 2011/0078888 A1 * | 4/2011 | Horkey | A61F 2/50 | 29/458 |
| 2013/0025031 A1 * | 1/2013 | Laperriere | A42B 3/125 | 2/414 |
| 2013/0070031 A1 * | 3/2013 | Nelson | B41J 2/105 | 347/82 |
| 2014/0109324 A1 * | 4/2014 | Rasmussen | B41M 5/0256 | 8/470 |
| 2015/0028094 A1 * | 1/2015 | Will | B41M 5/382 | 235/3 |
| 2015/0029285 A1 * | 1/2015 | Will | B41J 2/315 | 347/172 |
| 2015/0029289 A1 * | 1/2015 | Rosner | B41F 16/0046 | 347/217 |
| 2015/0032528 A1 * | 1/2015 | Will | G07F 17/26 | 705/14.27 |
| 2015/0075397 A1 * | 3/2015 | Gresty | C09D 11/037 | 101/129 |
| 2016/0046835 A1 * | 2/2016 | Ye | C09D 175/04 | 428/206 |
| 2016/0144640 A1 * | 5/2016 | Kearns | B41J 11/425 | 347/16 |
| 2016/0176175 A1 * | 6/2016 | Strauss | B30B 5/02 | 156/286 |
| 2016/0178326 A1 * | 6/2016 | Strauss | F41H 5/04 | 89/36.02 |
| 2016/0325173 A1 * | 11/2016 | Leary | A63B 71/141 | |

\* cited by examiner

METHOD FOR DYE-SUBLIMATION PRINTING AN ORTHOTIC SUBSTRATE AND ORTHOTIC PRODUCT MADE THEREBY

FIELD OF THE INVENTION

Embodiments of the present invention generally relate to methods for printing orthotic substrates with decorative designs and manufacturing orthotic products such as braces, supports, helmets, prosthetics, and chest protectors having decorative graphics, designs, and/or images printed thereon.

BACKGROUND

Orthotic products are commonly made with hard, moldable substrates such as malleable plastic materials. Different techniques such as offset printing can be used to print a decorative graphic, design, or image on surfaces of orthotic substrates. However, offset printing is time consuming and labor intensive. The ink mixture must be pre-tested to determine if the ink color, when transferred from a plate to a rubber blanket to the substrate surface, is true to the colors of the original design. If not, the ink must be remixed and retested to achieve the desired shade. Also, individual ink colors are printed separately. A decorative design having multiple ink colors must be re-printed with each color layered upon the other. As a result, offset printing offers a limited number of printed designs that are not easily customized due to time and labor constraints. Additionally, with this printing method, the ink adhesion to the orthotic substrate surface is poor, resulting in a printed design having inadequate scratch resistance.

Digital printing systems, e.g., laser printers, inkjet printers, digital web presses, etc., are faster than offset printing. Image applications can be used to create or customize a computer image file before it is printed on an orthotic substrate surface. Digital printers use the guidance of computer software to mix cyan, magenta, yellow, and black inks ("CMYK inks") to print decorative designs that accurately match the colors of the computer image file. This printing method can rapidly print an endless number of colorful graphics, designs, and/or images to meet specific color or size requirements on paper, textiles, and other surfaces. However, digital printers merely deposit a thin layer of CMYK inks on the orthotic substrate surface. The printed design can easily be scratched, rubbed, and removed from the orthotic substrate surface unless the CMYK inks are additionally adhered to the substrate using a secondary heat or curing process, which requires additional time and expense. Cracking, fading, and peeling are also common problems with digitally printed designs on moldable orthotic substrates.

Digital dye-sublimation printing can be used to quickly print vibrant designs that are durable and permanent on polyester substrates, i.e., polyester textiles or non-polyester substrates that have been pre-coated with a polyester surface. A combination of heat, pressure, and time causes the dye-sublimation CMYK inks to permeate the polyester substrate creating a scratch-resistant design that does not crack, fade, or peel. However, the heat and pressure melt and compress a moldable orthotic substrate making it unusable for orthotic product manufacturing.

To explain further, digital dye-sublimation printing comprises a two-part process. First, a digital printing system using special CMYK inks that sublimate, i.e., transition from a solid to a gas state when heat and pressure are applied for a period of time, to print a computer image file on a digital transfer paper substrate. The digital transfer paper substrate can be single sheets of paper or paper rolls, depending on the type of digital printing system that is used and the size and number of decorative designs to be printed. Second, the decorative printed design is transferred from the digital transfer paper substrate to a polyester substrate using a dye-sublimation printer, e.g., a flatbed heat press (for single sheets of paper) or an oil-heated roller calendar heat press (for large paper rolls). The digital transfer paper substrate is placed print side down on the polyester substrate, forming a duo-layered substrate. Pressure (approximately 120 psi) and heat (approximately 380-420 degrees Fahrenheit) are then applied to the duo-layered substrate using the dye-sublimation printer to sublimate and transfer the dye-sublimation CMYK inks from the digital transfer paper substrate to the polyester substrate. The heat opens the pores of the polyester substrate, and the applied pressure forces the dye gases to enter the open pores. When transfer of the dye-sublimation CMYK inks is competed (typically 30-90 seconds), the digital transfer paper substrate is removed from the polyester substrate. The pores of the polyester substrate close as it cools, and the dye-sublimation CMYK ink gases revert to a solid state, becoming part of the substrate. No drying time or post-treatment of the polyester substrate is required. One important advantage of dye-sublimation printing is that the results are permanent. Dye-sublimation CMYK inks penetrate the polyester substrate creating a durable, scratch-resistant design that does not crack, fade, or peel. In addition, the vibrant colors of the print design on the polyester substrate are true to the original computer image file.

Nevertheless, dye-sublimation printing is unsuitable for printing decorative designs on moldable orthotic substrates due to the dye-sublimation requirements. Orthotic substrates are typically malleable sheets of plastic material, e.g., polypropylene, having a thickness of ⅛-¼ inches. Heating a sheet of polypropylene to 380-420 degrees Fahrenheit for 30-90 seconds melts the plastic, and the added 120 psi required for ink transfer thins and warps the shape of the polypropylene sheet. Another important problem with dye-sublimation printing is the polyester substrate requirement. Polyester sheets that are ⅛-¼ inches thick are brittle and unmalleable, which makes them unsuitable for use as orthotic substrates.

SUMMARY

An embodiment of the present invention is a two-part method for dye-sublimation printing a decorative design on a moldable orthotic substrate including a first digital printing part and a second dye-sublimation printing part. The first digital printing part broadly comprises the steps of providing a digital printing system configured with at least one color of dye-sublimation CMYK inks and printing a computer image file of a decorative design on a digital transfer paper substrate. The second dye-sublimation printing part broadly comprises the steps of providing an oven heated to a first temperature, placing a moldable orthotic substrate inside the oven, heating the moldable orthotic substrate to a second temperature, positioning the digital transfer paper substrate on the moldable orthotic substrate with the decorative design down and in contact with the moldable orthotic substrate to form a duo-layered substrate, and sublimating the at least one color of dye-sublimation CMYK inks from the digital transfer paper substrate to the moldable orthotic substrate thereby printing the decorative design on the moldable orthotic substrate.

Another embodiment of the present invention is a custom orthotic product such as a brace, support, helmet, chest protector, prosthetic, or other orthotic device having a durable dye-sublimation printed decorative design. Straps, tongues, laces and other accessories can be attached to the custom orthotic product for enhanced comfort and fit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
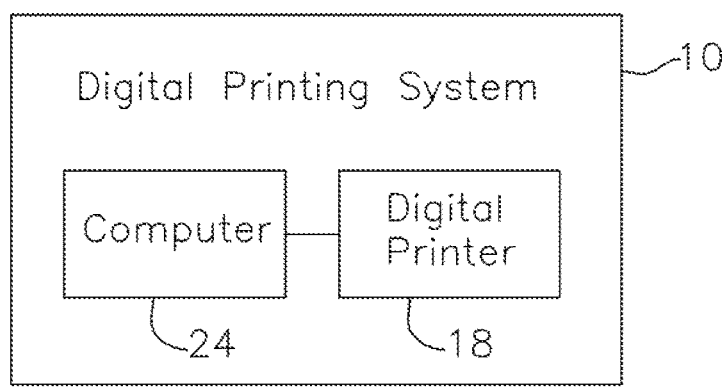
FIG. 1 is a schematic diagram of a digital printing system for use with embodiments of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning now to the drawing figures, and particularly to FIGS. 1-4, a two-part method for dye-sublimation printing a decorative design 12 on a moldable orthotic substrate 20a is illustrated. The first part broadly comprises providing a digital printing system 10 (see FIG. 1) configured with at least one color of dye-sublimation CMYK inks and printing a computer image based decorative design 12 on a surface 14 of a digital transfer paper substrate 16 (see FIG. 2) via a digital printer 18. The second part broadly comprises heating an oven to a first temperature, placing a moldable orthotic substrate 20 inside the oven, heating the moldable orthotic substrate 20 to a second temperature, positioning the digital transfer paper substrate 16 on the moldable orthotic substrate 20 with the surface 14 having the decorative design 12 down and in contact with a surface 22 of the moldable orthotic substrate 20 to form a duo-layered substrate, and sublimating the at least one color of dye-sublimation CMYK inks from the digital transfer paper substrate 16 to the moldable orthotic substrate 20 thereby printing the decorative design 12 on the moldable orthotic substrate 20. This two-part method can be used to make a customized moldable orthotic substrate 20 having a printed decorative design 12 with colors that accurately match the colors of the computer image file.

Figure 3:
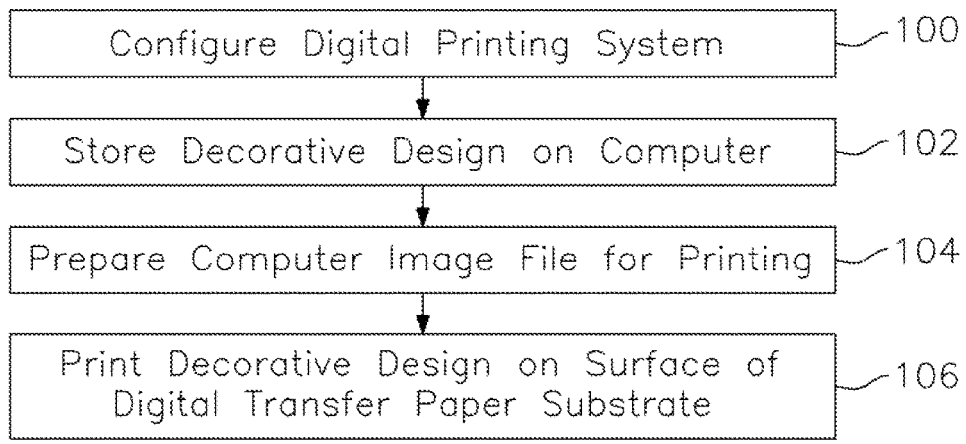
FIG. 3 is a flow chart of a first part of a method for dye-sublimation printing a decorative design on a moldable orthotic substrate in accordance with an embodiment of the invention.

In more detail, the first digital printing part begins with configuring the digital printing system 10 with at least one color of dye-sublimation CMYK inks, as shown in block 100 of FIG. 3. Various color combinations of dye-sublimation CMYK inks can be used to print a unique decorative design 12 of a computer image file. A combination of all four dye-sublimation CMYK inks can be used to print the decorative design 12 with colors that accurately replicate the colors of the computer image file. In one embodiment, the digital printing system 10 can be configured with specially formulated low temperature dye-sublimation CMYK inks, available from Sensient® of Switzerland. Sensient® low temperature dye-sublimation CMYK inks sublimate when heated to between 370-390 degrees Fahrenheit. For example, Sensient® CMYK dye-sublimation inks S4 SUBLI PA Blue 782, S4 SUBLI PA Red 782, S4 SUBLI PA Yellow 782, and S4 SUBLI PA Black 782 can be used to digitally print a computer file image on a digital transfer paper substrate.

The computer image file of the decorative design 12 can be electronically stored on a computer 24 of the digital printing system 10, as shown in block 102. The decorative design 12 can be in the form of a computer image file selected from licensed graphic art, an original design created by graphic art software, or an uploaded image or photograph. An image application, e.g., Adobe Photoshop® software, Photoscape®, etc., can be used to create and/or manipulate the computer image file before it is printed.

The selected computer image file can be prepared as a bitmap for printing, as shown in block 104. Raster image processing ("RIP") software can convert the computer image file data to a bitmap to meet specific color, density, and quality standards of the digital printing system 10. The RIP software can be implemented either as a software component of an operating system or as a firmware program executed on a microprocessor inside the digital printing system 10. The RIP software can optimize the performance of the digital printing system 10.

The decorative design 12 may then be printed on the surface 14 of the digital transfer paper substrate 16, as shown in block 106. Several selected computer image files can be simultaneously printed adjacent to each other on the digital transfer paper substrate 16 to reduce or eliminate paper waste. The digitally printed decorative designs can be physically separated or trimmed by cutting the digital transfer paper substrate 16 between designs and removing the excess paper surrounding the printed designs.

The digital transfer paper substrate 16 can be any kind, color, and size of digital transfer paper that weighs between 33-70 grams per square meter ("GSM"). A 58 GSM digital transfer paper substrate available from Beaver Paper™ of Georgia or any other suitable digital transfer paper substrate 16 can be used. The width of the digital transfer paper substrate 16 can vary depending on the desired print size of the selected computer image file/decorative design 12 and the type of digital printing system 10 that is used. For example, a digital transfer paper substrate 16 having widths of 2 inches to 150 inches or more, as precut sheets or as rolls, can be used with a variety of digital printing systems 10.

Figure 2:
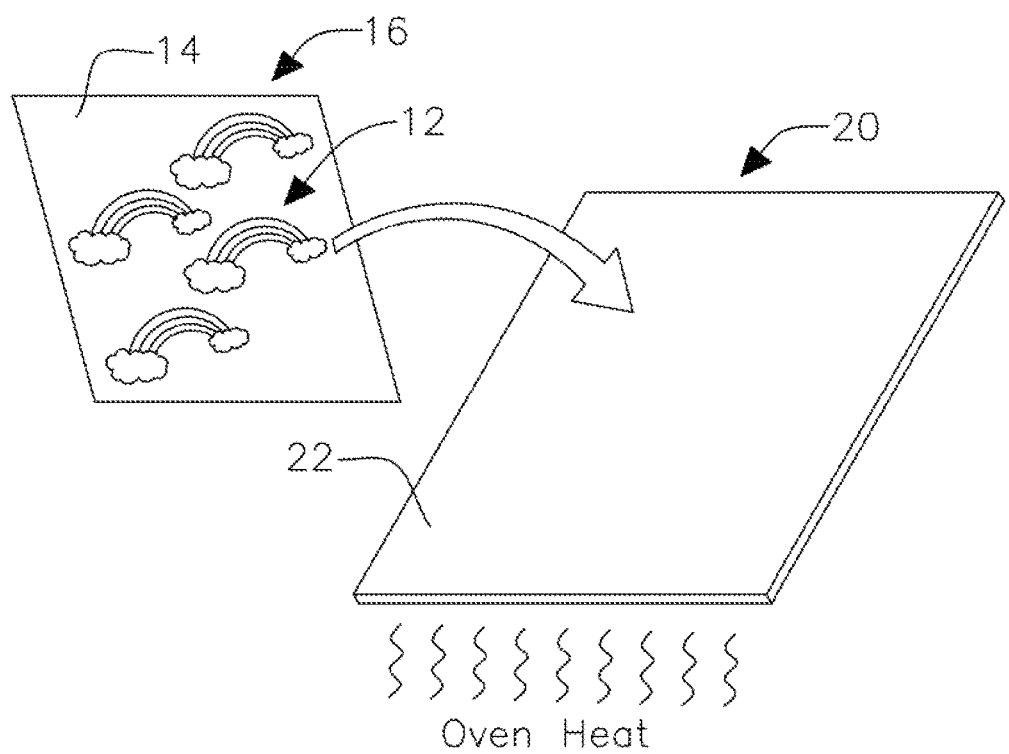
FIG. 2 is a perspective view of a printed decorative design being applied to a moldable orthotic substrate at an elevated temperature in accordance with an embodiment of the invention.
Figure 4:
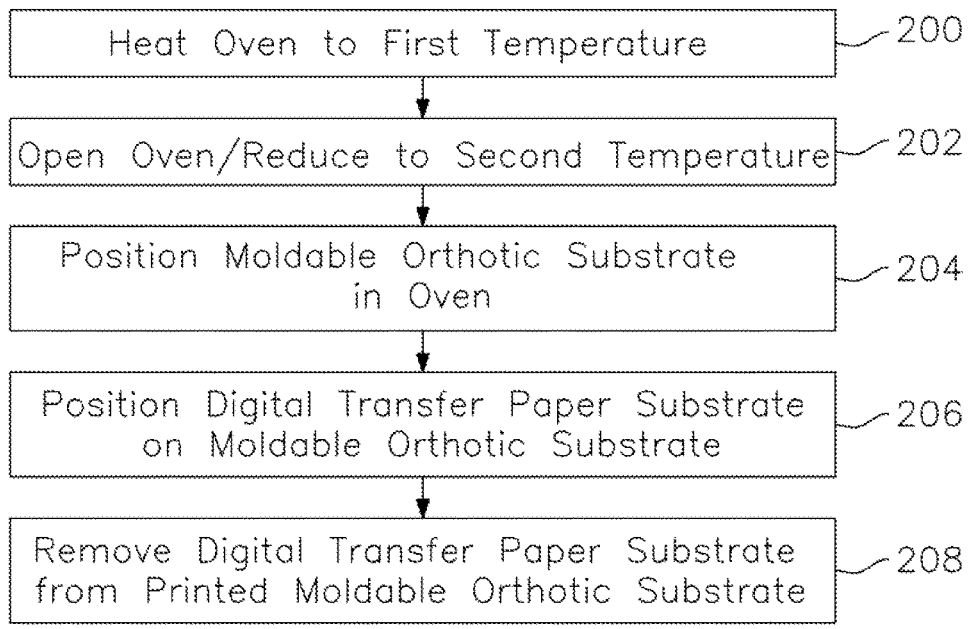
FIG. 4 is a flow chart of a second part of the method for dye-sublimation printing a decorative design on a moldable orthotic substrate.

Turning now to FIGS. 2 and 4, the second part is now discussed. First, the oven is heated to a first temperature, as shown in block 200. The first temperature is 10-30 degrees Fahrenheit higher than the temperature required for the dye-sublimation CMYK inks to transition from a solid to a gaseous state and permeate the moldable orthotic substrate 20.

The oven is then opened once it has reached the first temperature, as shown in block 202. Opening the oven door to position the moldable orthotic substrate 20 inside causes the oven's first temperature to rapidly drop to a second temperature. Accordingly, the selected first temperature must be sufficiently higher than the second temperature to allow for this expected temperature decrease. For example, in one embodiment, the first temperature of the oven can be 400 degrees Fahrenheit when printing a decorative design 12 that was digitally printed with Sensient® dye-sublimation CMYK inks that sublimate at a second temperature of 380 degrees Fahrenheit.

The moldable orthotic substrate 20 is then positioned inside the oven, as shown in block 204. In one embodiment, the moldable orthotic substrate 20 is placed inside the oven after it is heated to a first temperature of 400 degrees Fahrenheit for approximately 3-7 minutes, i.e., until the surface 22 of the moldable orthotic substrate 20 visibly softens and/or is heated to the second temperature. The oven can be any size or type that is capable of reaching the desired first temperature and is large enough to accommodate the size of the moldable orthotic substrate 20. In one embodiment, a masonry oven, commonly used to bake pizza, can be used. When the masonry oven has been heated to the first temperature, the oven door is opened, and the moldable orthotic substrate 20 is positioned inside the masonry oven directly on the lower surface of the masonry oven. In another embodiment, a traditional gas or electric oven is heated to the first temperature, the oven door is opened, and the moldable orthotic substrate 20 is positioned inside the oven on an oven rack. If additional support is needed, the moldable orthotic substrate 20 can be positioned on a metal pan or stone before it is placed on the oven rack.

The moldable orthotic substrate 20 can be made of any durable moldable material in any shape, thickness, or color. For example, the moldable orthotic substrate 20 can be a type of plastic material, including polypropylene, copolymer propylene, polyethylene, various types of plastic foams, ethylene vinyl acetate foams, or any other suitable material or combination of materials that can be used to manufacture an orthotic product 26. The shape and thickness of the moldable orthotic substrate 20 can vary. Flat sheets, strips, or other shapes of various sizes and thickness of the moldable orthotic substrate 20 can be used depending on the manufacturing requirements of the desired orthotic product 26. The moldable orthotic substrate 20 color can be any shade or color. For example, a white moldable orthotic substrate 20 can be used to print a decorative design 12 having vibrant colors that accurately replicate the selected computer image file.

The digital transfer paper substrate 16 is then quickly positioned with the printed decorative design surface 14 down and in contact with the surface 22 of the moldable orthotic substrate 20 to form a duo-layered substrate, as shown in block 206. Sublimation of the one or more dye-sublimation CMYK inks can occur instantaneously upon formation of the duo-layered substrate. In another embodiment, the digital transfer paper substrate 16 can be rubbed, e.g., manually rubbed with a worker's gloved hand or with a tool, to ensure that the entire decorative design 12 transfers to the moldable orthotic substrate 20. If needed, the oven door can be closed for 10-15 seconds to increase the temperature of the duo-layered substrate and facilitate ink sublimation and transfer from the digital transfer paper substrate 16 to the moldable orthotic substrate 20. When sublimation of the at least one color of dye-sublimation CMYK inks is completed, the digital transfer paper substrate 16 is then quickly peeled off and/or removed from the now printed moldable orthotic substrate, as shown in block 208.

The printed moldable orthotic substrate 20 can be used in at least one of two ways. First, the printed moldable orthotic substrate 20 can be used immediately while it is still warm and pliable to manufacture an orthotic product 26 as explained below. Alternatively, the printed moldable orthotic substrate 20 can be removed from the oven and allowed to cool to room temperature. After cooling, the printed moldable orthotic substrate 20 can be stored, stacked, packaged, or transported to a different location.

The above-described method of dye-sublimation printing a moldable orthotic substrate 20 provides many advantages over the prior art. For example, it can be used to quickly print an endless variety of durable, personalized decorative designs on moldable orthotic substrates 20. The moderate requirements of this unique method preserve the integrity of moldable orthotic substrate 20 so that the printed substrate can be used to manufacture a variety of orthotic products 26. The resulting scratch-resistant decorative design 12 is imbedded in the moldable orthotic substrate 20 and does not crack, fade, or peel. In addition, the colors of the printed decorative design 12 accurately match the colors of the computer image file.

Figure 5:
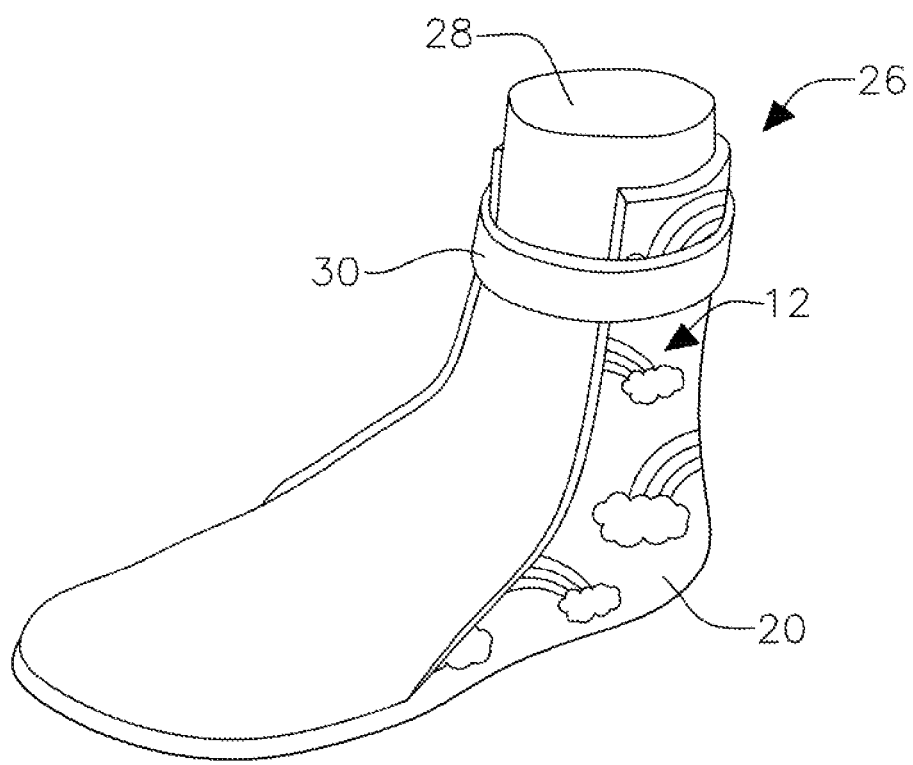
FIG. 5 is a perspective view of an orthotic product formed over a mold in accordance with an embodiment of the invention.
Figure 6:
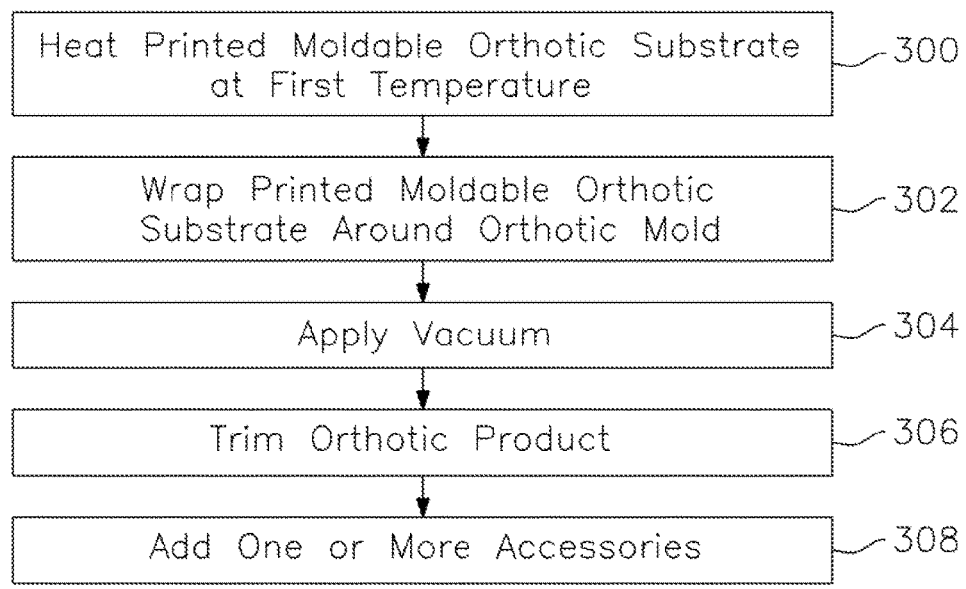
FIG. 6 is a flow chart of a method of forming the orthotic product of FIG. 5 in accordance with an embodiment of the invention.

With reference to FIGS. 5 and 6, a manufacturing method of using the printed moldable orthotic substrate 20 to make a custom orthotic product 26 such as a brace, support, helmets, chest protector, prosthetic, or other orthotic device is illustrated. The printed moldable orthotic substrate 20 can be used to manufacture an orthotic product 26 having a durable, personalized decorative design 12. First, the printed moldable orthotic substrate 20 can be heated in an oven at the first temperature (or another suitable temperature) for an additional 10-15 seconds to ensure pliability before it is used to manufacture the orthotic product 26, as shown in block 300 of FIG. 6. The printed moldable orthotic substrate 20 may then be wrapped around an orthotic mold 28, as shown in block 302. A vacuum may then be applied to conform the orthotic substrate 20 to the shape of the mold 28, forming the orthotic product 26, as shown in block 304. The orthotic product 26 can be trimmed to a desired length, size, or shape, and the edges can be smoothed, as shown in block 306.

One or more accessories 30, i.e., foam tongues, Velcro® straps, laces, etc., can be added to the orthotic product 26 depending on its intended use, as shown in block 308. The accessories 30 can be a single color or printed with various decorative designs. In one embodiment, the one or more accessories 30 are dye-sublimation printed with a decorative design 12 using a flatbed heat press or an oil-heated roller calendar heat press before the accessory is attached to the orthotic product 26. For example, in one embodiment, a dye-sublimation printed foam tongue and a dye-sublimation printed leg strap can be attached to an orthotic boot product to enhance comfort and fit. The one or more accessories 30 can be attached to the orthotic product 26 using various fasteners including rivets, eyelets, adhesives, glue, Velcro®, or any other type of suitable fasteners or combination of fasteners.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method for dye-sublimation printing a decorative design on a moldable orthotic substrate comprising:
   providing an oven heated to a first temperature;
   placing a moldable orthotic substrate inside the oven;
   heating the moldable orthotic substrate to a second temperature;
   positioning a transfer paper substrate having a digitally printed decorative design on the moldable orthotic substrate with the digitally printed decorative design down and in contact with the moldable orthotic substrate to form a duo-layered substrate; and
   sublimating the digitally printed decorative design instantaneously from the transfer paper substrate to the moldable orthotic substrate upon formation of the duo-layered substrate, wherein all sublimating is performed without applying pressure other than optionally rubbing the transfer paper substrate manually to ensure that the entire digitally printed decorative design transfers to the moldable orthotic substrate.

2. The method of claim 1, wherein at least one color of dye-sublimation CMYK inks is used to print the digitally printed decorative design on the transfer paper substrate.

3. The method of claim 2, wherein at least one color of the dye-sublimation CMYK inks sublimate when heated to between 370-390 degrees Fahrenheit.

4. The method of claim 1, wherein the transfer paper substrate has a weight range of 33-70 grams per square meter.

5. The method of claim 1, wherein the moldable orthotic substrate is a sheet of polypropylene.

6. The method of claim 5, wherein the sheet of polypropylene is ⅛ to ¼ inches thick.

7. The method of claim 1, wherein the moldable orthotic substrate is a sheet of polyethylene.

8. The method of claim 7, wherein the sheet of polyethylene is ⅛ to ¼ inches thick.

9. The method of claim 1, wherein the first temperature has a range of 350 to 400 degrees Fahrenheit.

10. The method of claim 2, wherein a digital web press configured with at least one color of the dye-sublimation CYMK inks is used to print the digitally printed decorative design on the transfer paper substrate.

11. The method of claim 1, wherein the oven is a masonry oven.

12. The method of claim 1, further comprising rubbing the transfer paper substrate manually to ensure that the entire digitally printed decorative design transfers to the moldable orthotic substrate.

13. A method for manufacturing an orthotic product having a dye-sublimation printed decorative design comprising:
   a dye-sublimation printing part comprising the steps of:
      providing an oven heated to a first temperature;
      placing a moldable orthotic substrate inside the oven;
      heating the moldable orthotic substrate to a second temperature;
      positioning a transfer paper substrate having a digitally printed decorative design on the moldable orthotic substrate with the digitally printed decorative design down and in contact with the moldable orthotic substrate to form a duo-layered substrate; and
   sublimating the digitally printed decorative design without pressure from the transfer paper substrate to the moldable orthotic substrate upon formation of the duo-layered substrate, wherein all sublimating is performed without applying pressure other than optionally rubbing the transfer paper substrate manually to ensure that the ensure digitally printed decorative design transfers to the moldable orthotic substrate;
   and
   a manufacturing part comprising the steps of:
      wrapping the printed moldable orthotic substrate around an orthotic mold;
      applying a vacuum to the orthotic mold to conform the printed moldable orthotic substrate to the orthotic mold to form an orthotic product.

14. The method of claim 13, further comprising attaching one or more accessories to the orthotic product.

15. The method of claim 14, wherein the one or more accessories are dye-sublimation printed with a decorative design.

16. The method of claim 13, wherein the moldable orthotic substrate is a sheet of polypropylene.

17. The method of claim 13, wherein at least one color of the dye-sublimation CMYK inks is used to print the digitally printed decorative design on the transfer paper substrate.

\* \* \* \* \*